US005706326A

United States Patent [19]

Gard

[11] Patent Number: 5,706,326

[45] Date of Patent: Jan. 6, 1998

[54] SYSTEMS AND METHODS OF DETERMINING FOCAL SPOT X-AXIS POSITION FROM PROJECTION DATA

[75] Inventor: Michael Floyd Gard, Perry, Okla.

[73] Assignee: General Electric Company, Milwaukee, Wis.

[21] Appl. No.: 577,559

[22] Filed: Dec. 22, 1995

[51] Int. Cl.[6] .................... G01N 23/00

[52] U.S. Cl. .................... 378/19; 378/4; 378/11

[58] Field of Search .................... 378/19, 11, 4

[56] References Cited

U.S. PATENT DOCUMENTS 4,559,639 12/1985 Glover et al. .................... 378/19

4,812,983 3/1989 Gullberg et al. .

4,991,189 2/1991 Boomgaarden et al. .................... 378/4

5,131,021 7/1992 Gard et al. .

*Primary Examiner*—Craig E. Church

*Attorney, Agent, or Firm*—John S. Beulick; John H. Pilarski

[57] ABSTRACT

The present invention, in one form, is a method of determining focal spot position in a computed tomography system using conventional scan data. The computed tomography system includes, in one embodiment, a bowtie filter attenuating an x-ray beam along two symmetrically disposed raypaths. The symmetrical raypaths impinge upon respective detector channels at identifiable path lengths. The raypath lengths are compared to determine whether the focal spot has shifted.

20 Claims, 2 Drawing Sheets

SYSTEMS AND METHODS OF DETERMINING FOCAL SPOT X-AXIS POSITION FROM PROJECTION DATA

FIELD OF THE INVENTION

This invention relates generally to computed tomography (CT) imaging and more particularly, to the determination of focal spot position from projection data acquired from a CT scan.

BACKGROUND OF THE INVENTION

In at least one known CT system configuration, an x-ray source projects a fan-shaped beam which is collimated to lie within an X-Y plane of a Cartesian coordinate system and generally referred to as the "imaging plane". A special x-ray attenuator, sometimes referred to as a bowtie filter, is frequently installed near the x-ray tube to remove low-energy x-rays which would otherwise contribute additional radiological dose without any contribution to the diagnostic image. The x-ray beam then passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are located on a rotatable gantry. As the gantry rotates, the loci of the x-ray source and detector array define the imaging plane. The gantry rotates around the object to be imaged so that the angle at which the x-ray beam intersects the object constantly changes. A group of x-ray attenuation measurements, i.e., projection data, from the detector array at one gantry angle are referred to as a "view". A "scan" of the object comprises a set of views made at different gantry angles during one revolution of the x-ray source and detector. In an axial scan, projection data are processed to construct an image that corresponds to a two dimensional slice taken through the object. One method for reconstructing an image from a set of projection data is referred to in the art as the filtered back projection technique. This process converts attenuation measurements from a scan into integers called "CT numbers" or "Hounsfield units", which are used to control the brightness of a corresponding pixel on a cathode ray tube display.

The x-ray source typically includes an evacuated glass x-ray envelope containing an anode and a cathode. X-rays are produced by applying a high voltage across the anode and cathode and accelerating electrons from the cathode against a focal spot on the anode. The x-rays produced by the x-ray tube diverge from the focal spot in a generally conical pattern.

To produce a quality image from an axial scan in CT scanners such as, for example, a third-generation CT scanner, it is desirable for the focal spot to be properly aligned in the x-axis. Misalignment of the focal spot by more than 0.02 mm is known to cause demonstrable resolution loss and image degradation in known CT scanners. Accordingly, it is desirable to properly maintain focal spot position in the x-axis for optimal image quality.

Tube alignments, either in the factory or during a field tube change, typically require a number of special scans, called pin scans, and mechanical adjustment of the x-ray tube position on the gantry. This is a time-consuming process, and it is generally inconvenient and impractical to mechanically adjust the tube location to maintain optimal focal spot position during the life of the tube.

Focal spot alignment is particularly difficult in systems which use multiple focal spot tubes. In general, it is difficult to maintain multiple focal spots at exactly the same position (i.e., to maintain focal spot coincidence), and it is often necessary to mechanically optimize one focal spot position at the expense of the other.

Thermal drift of the focal spot also degrades image quality. Particularly, as various elements of the x-ray tube heat during use, thermal expansion causes small mechanical displacements of critical x-ray source structures and a corresponding shift in focal spot position. Various calibration steps and corrections, such as correction vectors to calibrate projection data, are used to minimize the effects of thermal drift, but the corrections involved are applied in an attempt to recover image quality after degradation has occurred.

To avoid these alignment problems and to correct for focal spot movement, it is known to use magnetic deflection to position focal spots. It is also known to use electrostatic deflection for the same purpose. However, both techniques require position information from a pin scan or a similar measurement to determine the amount of movement desired to bring the focal spot into optimal alignment. Acquiring this information is not objectionable during a tube change, except for the time involved, or at the beginning of the working day, but it is clearly undesirable to interrupt a scan series to perform a pin scan to compensate for thermal drift of the focal spot.

It would be desirable to determine and maintain focal spot position without performing any pin scans. It also would be desirable to facilitate focal spot position alignment in a system using multiple focal spot tubes.

SUMMARY OF THE INVENTION

These and other objects may be attained in a system which, in one embodiment, determines focal spot x-axis position from conventional scan data. Particularly, in accordance with one embodiment, focal spot x-axis position is determined from knowledge of bowtie filter x-ray beam attenuation along symmetrically disposed raypaths, and determining and comparing the path lengths of each raypath. Each raypath is directly related to the sum of signal intensities received by each detector over a scan. As the focal spot moves in the x-axis direction, each raypath changes length. A differential raypath, indicating a shift in the focal spot, may be determined according to the following equation:

$$p_a - p_b = \frac{-1}{\mu_{BT}} \left[ \frac{\sum_{SCAN} I_A}{\sum_{SCAN} I_B} - 1 \right] \qquad (1)$$

where:

$p_A - p_B$ = differential raypath length between the focal spot and a detector A and the focal spot and a detector B, $\mu_{BT}$ = attenuation coefficient of the bowtie filter, $\sum_{SCAN} I_A$ = sum of signal intensity at the detector $A$ over an entire 360° scan, and $\sum_{SCAN} I_B$ = sum of signal intensity at the detector $B$ over an entire 360° scan.

This differential raypath is then compared to an initial differential raypath length to determine whether the focal spot has shifted.

By identifying beam position as described above, focal spot alignment and focal spot motion can be readily detected. Such system also permits determination of focal spot position without performing any pin scans.

DETAILED DESCRIPTION OF THE DRAWINGS

Figure 1:
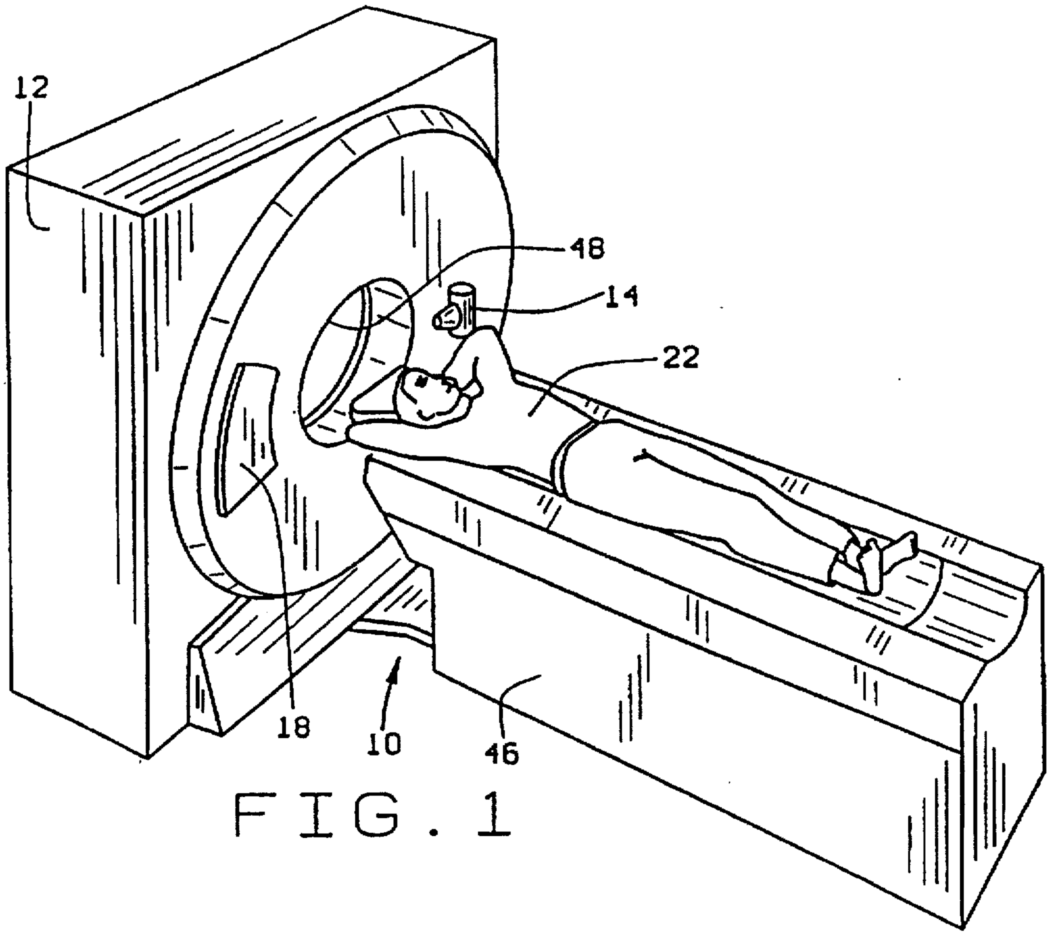
FIG. 1 is a pictorial view of a CT imaging system.
Figure 2:
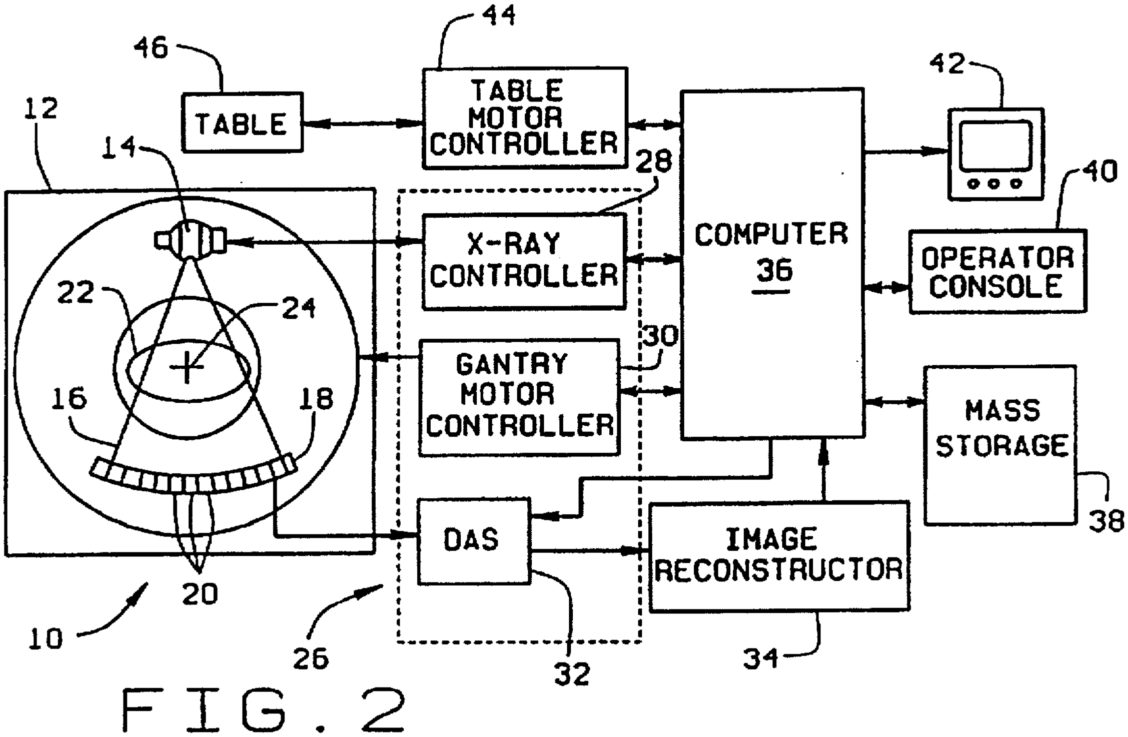
FIG. 2 is a block schematic diagram of the system illustrated in FIG. 1.

Referring to FIGS. 1 and 2, a computed tomograph (CT) imaging system 10 is shown as including a gantry 12 representative of a "third generation" CT scanner. Gantry 12 has an x-ray source 14 that projects a fan beam of x-rays 16 toward a detector array 18 on the opposite side of gantry 12. Detector array 18 is formed by detector elements 20, or channels, which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
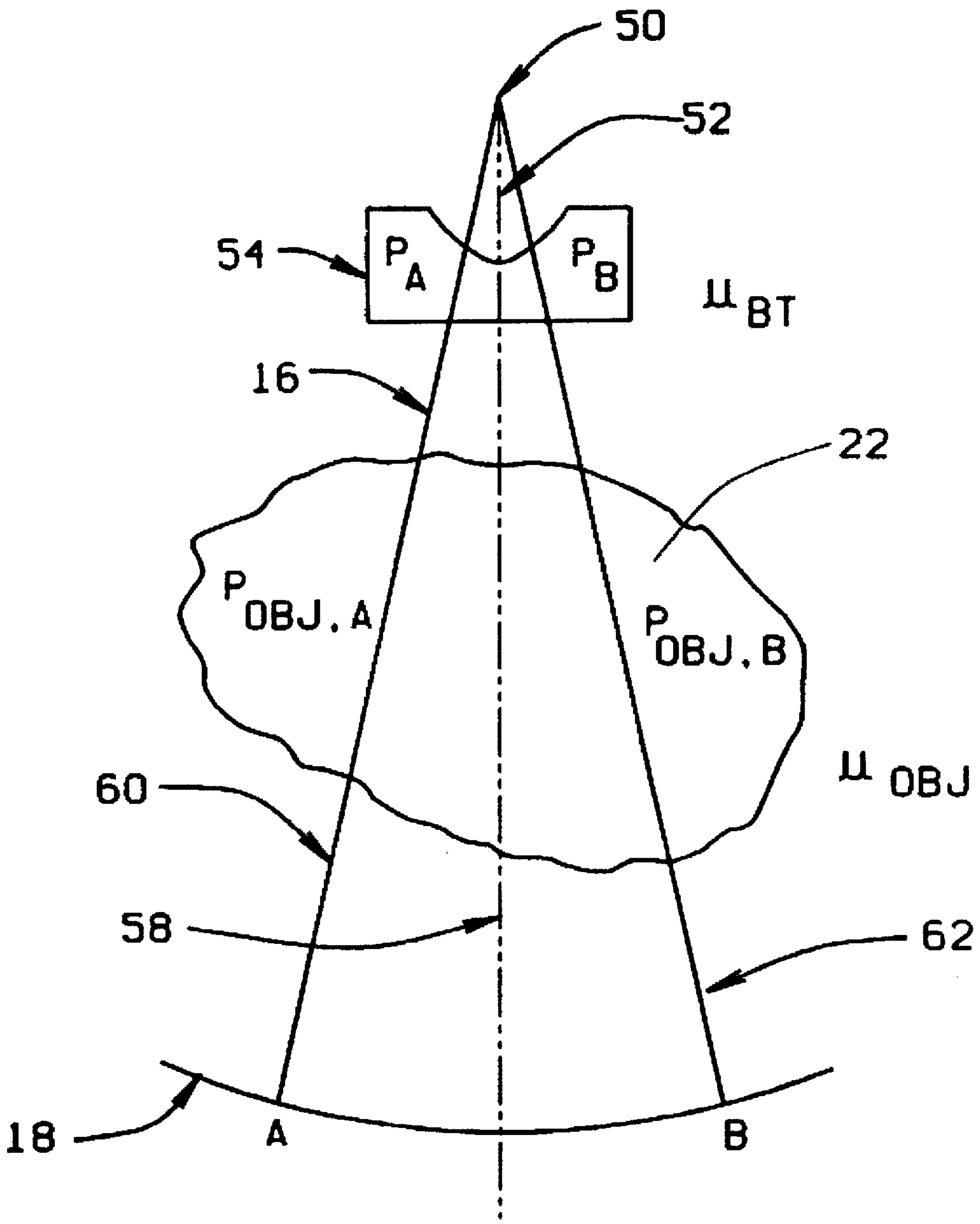
FIG. 3 is a geometric schematic of one embodiment of the present invention.

In accordance with one embodiment of the present invention, and referring to FIG. 3, x-ray source 14 has a focal spot 50 from which x-ray beam 16 emanates. X-ray beam 16 is then filtered by bowtie filter 54 and projected toward detector array 18 along a fan beam axis 58 centered within beam 16. After impinging upon bowtie filter 54, two raypaths 60, 62 are symmetrically disposed about centerline fan beam axis 58. Two symmetrical raypaths 60, 62 terminate at detector channels A and B. When focal spot 50 shifts, raypaths 60, 62 change in length. For example, if focal spot 50 moves in the x-direction toward detector B, raypath 62 becomes shorter and raypath 60 becomes longer. A shift in focal spot 50 may thus be detected by identifying any change in the lengths of raypaths 60, 62, The length of each raypath 60, 62 is related to the signal intensities received at detector channels A and B. The radiation measured at detector channels A and B is determined by attenuation in the bowtie filter and in the scanned object. For an initial x-ray signal of intensity $I_0$, the measured intensities $I_A$ and $I_B$ at channels A and B, respectively, are determined by the equatios:

$$I_A=I_0e^{-\mu_{BT}p_A}e^{-\mu_{OBJ}p_{OBJ,A}} \tag{2a}$$

$$I_B=I_0e^{-\mu_{BT}p_B}e^{-\mu_{OBJ}p_{OBJ,B}} \tag{2b}$$

where:

$p_A$=raypath length from focal spot 50 to detector Channel A, $p_B$=raypath length from focal spot 50 to detector Channel B, $\mu_{OBJ}$=attenuation of object being scanned, $\mu_{BT}$=attenuation coefficient of bowtie filter, $e^{-\mu_{BT}p_A}$=attenuation through the bowtie filter of the raypath associated with detector A, $e^{-\mu_{BT}p_B}$=attenuation through the bowtie filter of the raypath associated with detector B.

$e^{-\mu_{OBJ}p_{OBJ,A}}$=attenuation through the object along raypath associated with detector A, and $e^{-\mu_{OBJ}p_{OBJ,B}}$=attenuation through the object along raypath associated with detector B.

For a given focal spot position, raypath lengths $p_A$ and $p_B$ are constants, resulting in a constant attenuation loss in bowtie filter 54 for each detector channel A and B. In an ideal geometry, these lengths will not only be constant but they will also be equal because of symmetry. However, lengths $p_A$ and $p_B$ are generally not the same.

Typically, the attenuation in the scanned object, $\mu_{OBJ}$ is a function of view angle. Distances $p_{OBJ,A}$ and $p_{OBJ,B}$ are the raypath lengths through the scanned object corresponding to detectors A and B, respectively.

Over a complete 360° rotation in a conventional axial scan, the sum of all measurements at detectors A and B may be determined according to the equations:

$$\sum_{SCAN} I_A = I_0e^{-\mu_{BT}p_A} \sum_{SCAN} I_A = I_0e^{-\mu_{OBJ,A}} \tag{3a}$$

$$\sum_{SCAN} I_B = I_0e^{-\mu_{BT}p_B} \sum_{SCAN} I_B = I_0e^{-\mu_{OBJ,B}} \tag{3b}$$

The term $e^{-\mu_{BT}p_A}$ and $e^{-\mu_{BT}p_B}$ are constant and may be moved outside the summation. The summed signals at detector channels A and B are substantially identical over a complete scan rotation, i.e., 360°, because the raypaths to detector elements A and B are symmetrically displaced, and both channels see exactly the same material in the scanned object. Channels A and B are merely displaced in phase. This is most evident in parallel-beam geometry. For example, for each detector A and B:

$$\sum_{SCAN} e^{-\mu_{OBJ}p_{OBJ,A}} = \sum_{SCAN} e^{-\mu_{OBJ}p_{OBJ,B}} \tag{4}$$

The ratio of the two summed intensity signals given by (3a) and (3b) provides that:

$$\frac{\sum_{SCAN} I_A}{\sum_{SCAN} I_B} = e^{-\mu_{BT}(p_A-p_B)} \tag{5}$$

Therefore, as a result of equation (5):

$$\ln\left[\frac{\sum_{SCAN} I_A}{\sum_{SCAN} I_B}\right] = -\mu_{BT}(p_A - p_B) \quad (6)$$

$$p_a - p_b = \frac{-1}{\mu_{BT}} \ln\left[\frac{\sum_{SCAN} I_A}{\sum_{SCAN} I_B}\right] \quad (7)$$

Because the sums $$\sum_{SCAN} I_A \text{ and } \sum_{SCAN} I_B$$

are approximately equal, a common approximation to the natural logarithm ln(1+x) may be used to rewrite equation (7) as:

$$1 + x = \frac{\sum_{SCAN} I_A}{\sum_{SCAN} I_B} \quad (8)$$

Since ln(1+x) is approximately equal to x for small x, equations (7) and (8) may be combined as the equation:

$$\ln\left[\frac{\sum_{SCAN} I_A}{\sum_{SCAN} I_B}\right] \cong \frac{\sum_{SCAN} I_A}{\sum_{SCAN} I_B} - 1 \quad (9)$$

As a result, equations (7) and (9) may be combined to yield:

$$p_a - p_b = \frac{-1}{\mu_{BT}}\left[\frac{\sum_{SCAN} I_A}{\sum_{SCAN} I_B} - 1\right] \quad (10)$$

Differential path length through bowtie filter 54 is thus a known function of the attenuation coefficient of the bowtie filter material (a material constant) and the ratio of the summed intensities at detector cells A and B as measured over a complete 360° axial scan.

The initial differential path length $p_A - p_B$ for system 10 will be constant for a properly aligned focal spot, i.e., a perfectly aligned focal spot will always give the same value $p_A - p_B$. As the focal spot moves, as might happen because of thermal effects, one path length through the bowtie filter increases while the other path length decreases. This change will be reflected in the differential path length given by equation (10). Therefore, knowledge of this differential path length is sufficient to identify a change in focal spot position. After a change in focal spot position is detected, the focal spot may be repositioned, for example, by either magnetic or electrostatic focal spot deflection.

In accordance with another embodiment of the present invention, x-ray beam 16 may utilize four raypaths through bowtie filter 54. These four raypaths impinge upon four detector channels $A_1$, $A_2$, $B_2$, $B_2$. Channels $A_1$ and $A_2$ are located on one side of fan beam axis 58, and channels $B_1$ and $B_2$ are located on the other side of fan beam axis 58. Composite signal intensities $I_A$ and $I_B$ are formed according to the four channels, i.e., $I_A = I_{A_1} + I_{A_2}$ and $I_B = I_{B_1} + I_{B_2}$.

In yet another embodiment, x-ray beam 16 may utilize raypaths through bowtie filter 54 to impinge upon six or more detector channels $A_1, A_2, \ldots, A_n, B_1, B_2, \ldots, B_n$, where n is one half of the total number of channels. Each detector channel $A_n$ is opposite corresponding channel $B_n$ with respect to beam axis 58. Composite signal intensities $I_A$ and $I_B$ are formed according to $I_A = I_{A_1} + I_{A_2} + \ldots + I_{A_n}$, and $I_B = I_{B_1} + I_{B_2} + \ldots + I_{B_n}$. More than two channels is believed to better compensate for any attenuation caused by patient motion during the scan.

The various embodiments may be used in conjunction with either a standard axial scan or a helical scan. Particularly, the present algorithm may be used with a helical scan, where phase difference between $I_A$ and $I_B$ and a knowledge of table translation rate are known. In addition, although filter 54 is described herein as a bowtie type filter, filter 54 could have many different configurations. Filter 54 is required, however, to provide a monotonically varying differential path length as the focal spot moves in the x-axis direction.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the CT system described herein is a "third generation" system in which both the x-ray source and detector rotate with the gantry. Many other CT systems including "fourth generation" systems wherein the detector is a full-ring stationary detector and only the x-ray source rotates with the gantry, may be used if individual detector elements are corrected to provide substantially uniform responses to a given x-ray beam. Moreover, the system described herein performs an axial scan, however, the invention may be used with a helical scan although more than 360° of data are required. Similarly, the embodiment described herein used two detector channels, however, more than two detector channels may be used. Accordingly, the spirit and scope of the invention are to be limited only by the terms of the appended claims.

What is claimed is:

1. A computed tomography system comprising an x-ray source having a focal spot during operation, a filter for providing a monotonically varying differential path length as the focal spot moves relative to the filter in at least one dimension, a detector having a plurality of detector channels, said x-ray source oriented so that the x-rays from said x-ray source impinge upon said detector during operation, and an x-ray beam position detection system coupled to said detector, said x-ray beam position detection system comprising a processor programmed to:

for respective selected detector channels, sum the signal intensities detected at each selected detector channel over an entire scan to generate a summed intensity signal for each selected channel, at least two detector channels being selected for such summation; and determine a change in x-ray beam position using the summed intensity signals for at least two selected detector channels.

2. A system in accordance with claim 1 wherein to determine change in the x-ray beam position, said system is further configured to identify a current differential path length $p_A - p_B$ according to:

$$p_a - p_b = \frac{-1}{\mu_{BT}}\left[\frac{\sum_{SCAN} I_A}{\sum_{SCAN} I_B} - 1\right]$$

where:

$p_A - p_B$ = differential raypath length between said focal spot and a detector channel A and said focal spot and a detector channel B, $\mu_{BT}$=attenuation coefficient of the filter, $\sum_{SCAN} I_A$ = sum of signal intensity at the detector channel A over an entire 360° scan, and $\sum_{SCAN} I_B$ = sum of signal intensity at the detector channel B over an entire 360° scan.

3. A system in accordance with claim 2 wherein to determine change in said x-ray beam position, said system is further configured to identify an initial differential path length and compare the current differential path length with said initial differential path length.

4. A system in accordance with claim 2 wherein the computed tomography system is configured to perform an axial scan.

5. A system in accordance with claim 2 wherein the computed tomography system is configured to perform a helical scan.

6. A system in accordance with claim 2 wherein the computed tomography system has two detector channels.

7. A system in accordance with claim 1 wherein the computed tomography system has at least four contiguous detector channels and wherein at least one x-ray raypath impinges on each detector channel, and wherein to determine the change in the x-ray beam position, said system is further configured to identify a current differential path length $p_A-p_B$ according to:

$$p_a - p_b = \frac{-1}{\mu_{BT}}\left[\frac{\sum_{SCAN} I_A}{\sum_{SCAN} I_B} - 1\right]$$

where:

$p_A$=sum of raypath lengths between said focal spot and each detector channel A on one side of said initial centerline, $p_B$=sum of raypath lengths between said focal spot and each detector channel B on the other side of said initial centerline, $p_A-p_B$=differential raypath length, $\mu_{BT}$=attenuation coefficient of the filter, $\sum_{SCAN} I_A$ = sum of signal intensity at each detector channel A over an entire 360° scan, and $\sum_{SCAN} I_B$ = sum of signal intensity at each detector channel B over an entire 360° scan.

8. A system in accordance with claim 7 wherein to determine the change in the x-ray beam position, said system is further configured to identify an initial differential path length and compare the current differential path length with the initial differential path length.

9. A system in accordance with claim 7 wherein the computed tomography system is configured to perform an axial scan.

10. A system in accordance with claim 7 wherein the computed tomography system is configured to perform a helical scan.

11. A method for operating a computed tomography system, the computed tomography system including an x-ray source having a focal spot during operation, a filter for providing a monotonically varying differential path length as the focal spot moves relative to the filter in at least one dimension, and a detector having a plurality of detector channels, the x-ray source oriented so that the x-rays from the x-ray source impinge upon the detector during operation, said method comprising the steps of:

for respective selected detector channels, summing the signal intensities detected at each selected detector channel over an entire scan to generate a summed intensity signal for each selected channel, at least two detector channels being selected for such summation; and determining a change in x-ray beam position using the summed intensity signals for at least two selected detector channels.

12. A method in accordance with claim 11 wherein the step of determining change in the x-ray beam position comprises identifying a current differential path length $p_A-p_B$ according to:

$$p_a - p_b = \frac{-1}{\mu_{BT}}\left[\frac{\sum_{SCAN} I_A}{\sum_{SCAN} I_B} - 1\right]$$

where $p_A-p_B$=differential raypath length between said focal spot and a detector channel A and said focal spot and a detector channel B, $\mu_{BT}$=attenuation coefficient of the filter, $\sum_{SCAN} I_A$ = sum of signal intensity at the detector A over an entire 360° scan, and $\sum_{SCAN} I_B$ = sum of signal intensity at the detector B over an entire 360° scan.

13. A method in accordance with claim 12 wherein the step of determining change in said x-ray beam position further comprises identifying an initial differential path length and comparing the current differential path length with the initial differential path length.

14. A method in accordance with claim 12 wherein the computed tomography system is configured to perform an axial scan.

15. A method in accordance with claim 12 wherein the computed tomography system is configured to perform a helical scan.

16. A method in accordance with claim 12 wherein the computed tomography system has two detector channels.

17. A method in accordance with claim 11 wherein the computed tomography system has a plurality of contiguous detector channels and wherein at least one x-ray raypath impinges on each detector channel, and wherein the step of determining the change in the x-ray beam position comprises identifying a current differential path length $p_A-p_B$ according to:

$$p_a - p_b = \frac{-1}{\mu_{BT}}\left[\frac{\sum_{SCAN} I_A}{\sum_{SCAN} I_B} - 1\right]$$

where:

$p_A$=sum of raypath lengths between said focal spot and each detector channel A on one side of said initial centerline, $p_B$=sum of raypath lengths between said focal spot and each detector channel B on the other side of said initial centerline, $p_A-p_B$=differential raypath length, $\mu_{BT}$=attenuation coefficient of the filter, $\sum_{SCAN} I_A$ = sum of signal intensity at each detector channel $A$ over an entire 360° scan, and $\sum_{SCAN} I_B$ = sum of signal intensity at each detector channel $B$ over an entire 360° scan.

18. A method in accordance with claim 17 wherein the step of determining the change in the x-ray beam position comprises identifying an initial differential path length and comparing the current differential path length with the initial differential path length.

19. A method in accordance with claim 17 wherein the computed tomography system is configured to perform axial scans.

20. A method in accordance with claim 17 wherein the computed tomography system is configured to perform helical scans.

* * * * *